Dec. 23, 1952        R. A. AMMON        2,623,152
SOLDERING TWEEZERS
Filed Oct. 4, 1951
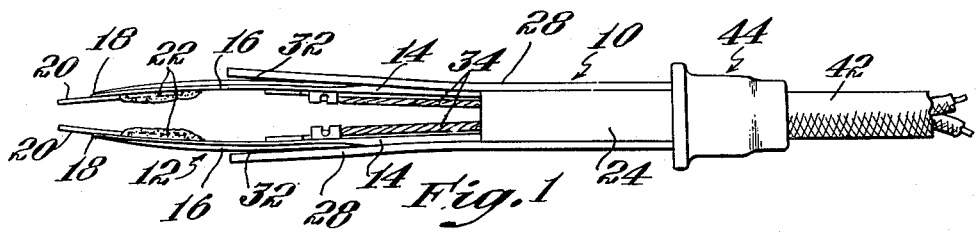
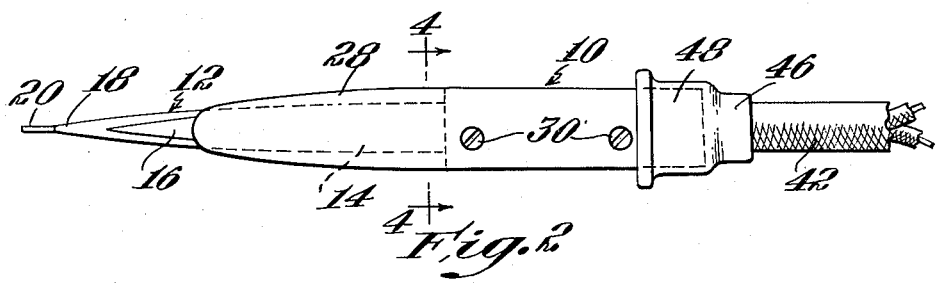
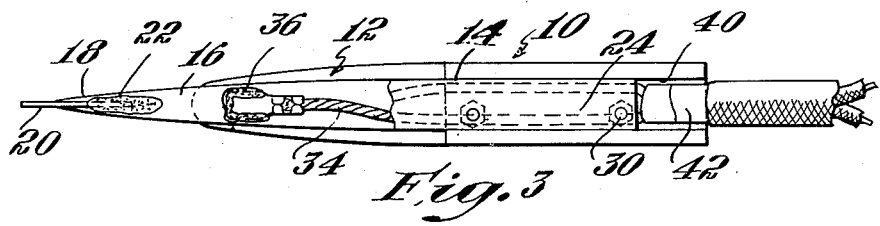
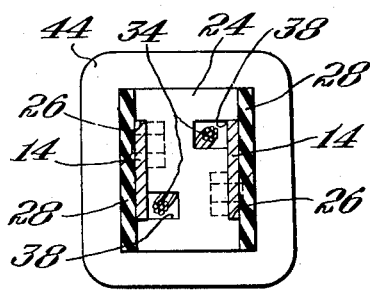
Inventor
Roscoe A. Ammon
by Roberts, Cushman & Grover
att'ys.

Patented Dec. 23, 1952

2,623,152

UNITED STATES PATENT OFFICE 2,623,152

SOLDERING TWEEZERS

Roscoe A. Ammon, Manchester, N. H., assignor to Contact, Inc., Cambridge, Mass., a corporation of Massachusetts Application October 4, 1951, Serial No. 249,662

1 Claim. (Cl. 219—26)

This invention relates to tools and more especially to improved soldering and/or welding tweezers.

The principal objects of the invention are to provide a very simple, light weight yet positively acting tweezer which may be used to pick up and hold difficult to handle small parts such as screws, rivets, grommets, bits of wire and etc. commonly used in the assembly and manufacture of electrical equipment, radios, precision instruments and the like, to facilitate insertion of such parts into small spaces which are inaccessible to the hands and fingers and while holding the parts in place effecting a welding or soldering of the parts. A further object is to provide a tweezer, the gripping portion of which will raise the part or parts to soldering or welding temperature rapidly so that the operator's hands are not tired by prolonged squeezing of the tweezers or by holding them in a difficult or awkward position. Still further objects are to provide tweezers of a kind wherein the soldering and/or welding tips will not stick to the parts, which will release the parts without manipulation on the part of the operator, and the handle part of which will not heat up unduly even after prolonged use so as to be uncomfortable to the hands or so that the tweezers will have to be put down to cool. Other objects are to provide a tool which will not be dangerous to the operator even though carelessly handled, which is extremely durable and the parts of which may be removed and replaced with a minimum of effort by the use of an ordinary screw driver.

As illustrated herein, the tool or device has a pair of elongate flat metal blades made fast in substantially parallel relation to the opposite sides of a spacer block comprised of an insulative material. The spacer block has shallow recesses in its opposite faces and the blades have shank portions seated in the recesses. Stemming from the shanks and extending beyond the spacer block at one end are prongs which taper both in width and thickness to blunt pointed ends, the prongs being bowed toward each other so that they converge but do not meet. Slender tungsten tips are made fast to the pointed ends of the prongs and may be brought into engagement by squeezing the prongs. Electric conductors are fastened to the prongs just beyond the shanks to conduct current therethrough to the tungsten tips. Plates of insulative material are applied externally to the blades and are fastened together with the shanks to the spacer blocks thereby forming a handle by which the tool may be held. Portions of the plates extend forwardly over the prongs and are bowed outwardly to provide air gaps between them and the prongs. By squeezing the outwardly bowed portions into contact with the inwardly bowed prongs the tips may be brought into contact to close the circuit between the conductors.

The invention will now be described in greater detail with reference to the accompanying drawings wherein:

Fig. 1 is a side elevation of the tweezers;

Fig. 2 is a plan view of Fig. 1;

Fig. 3 is a plan view similar to Fig. 3 with the blade and covering plate at one side removed; and Fig. 4 is a vertical section taken on the line 4—4 of Fig. 2.

Referring to the figures, the tweezers indicated generally at 10 comprises a pair of flat elongate blades 12 arranged in substantially parallel spaced relation, each blade having a substantially rigid shank portion 14 from which stems a prong 16 which tapers both in thickness and width to a blunt point 18. The blades are preferably made of steel and the prongs may be flash coated with copper to improve their electric conductance. Fastened to the inside of each point 18 so as to extend forwardly therefrom is a tip 20 comprised of tungsten wire of substantially circular cross section, the wire being made fast to the prong adjacent the point by silver solder 22. The prongs 16 are bowed toward each other so that their forward pointed ends converge but terminate short of actual intersection and as illustrated the tungsten tips in like manner converge but do not touch being normally held spaced by the natural resilience of the prongs. The rear or shank portions 14 of the blades are fastened to a spacer block 24 which is shown in Fig. 4, is of substantially rectangular cross section, consists of an insulating material and has in its opposite faces shallow substantially rectangular recesses 26 adapted to receive the shank portions of the blades, flushed with the unrecessed portions of its surfaces. Flat narrow cover plates 28 also of insulative material are applied to the opposite surfaces of the spacer block so as to overlie the shank portions of the blades and constitute the handle portion of the tool. These cover plates have forwardly extending portions which lie along the outer surfaces of the blades and terminate at about the mid-portions of the prongs, their ends being generally tapered and rounded. The cover plates are bowed outwardly slightly as illustrated in Fig. 1 so as to leave appreciable air gaps 32 between their inner surfaces and the outer surfaces of the prongs for a purpose which will appear hereinafter. Screws 30 are employed for fastening both the cover plates and the blades to the spacer block. Electric conductors 34 are provided for supplying current to the blades and as illustrated the inner ends of these conductors are fastened by means of solder 36 to the inner surfaces of the blades just forwardly of the junctions of the shank portions and the prongs, substantially opposite the origin of the air gaps. The conductors extend rearwardly along the inner surfaces of the blades through grooves 38 formed in the spacer block below the recesses 26. As illustrated in Fig. 3, the rear end of the spacer block terminates short of the rear ends of the plates 28 so that a socket 40 open at two sides is provided into which the conductors 34 extend where they enter the sheath of a flexible cable 42. In order to make a neat appearing and attractive instrument, the end of the cable 42 from which the conductors 34 extend is pressed into this socket 40 and the junction is sealed with a rubber cap 44 having a neck 46 which snugly engages the cable and a head 48 which snugly engages the rear ends of the plates 28 and which walls in the open sides of the socket.

The tweezers as thus described are especially effective for fine soldering because they combine two types of heating, one generated in the work itself and the other generated in the tweezer tips, this latter being transmitted to the work by way of conduction. The heat generated in the work is resistance heating due to the voltage drop in the current passing through the work. The conductive heat produced in the tweezer tips is also resistance heating but is physically conducted to the work. The combined effect of the resistance heating developed in the work and the resistance heating developed in the tips themselves and conducted from the tips to the work creates a temperature sufficiently high to melt the solder immediately and results in a perfect soldered connection. Since the work itself melts the solder, there is no possibility of a "cold solder joint."

Certain other important aspects of the tweezers as described above will be apparent from the construction but are deemed of sufficient importance to warrant further emphasis at this point. The prongs of the metal blades are bowed toward each other and the covering plates 28 are bowed in the reverse direction so as to provide substantial air gaps 32 between the plates and prongs thus minimizing any transfer of heat from the prongs to the covering plates so that the operator experiences no discomfort from the heating of the handle even after continued or prolonged use. In other words, the air gaps act as insulators preventing direct conductance of heat to the covering plates whenever squeezing pressure is released. Heating of the blades is further minimized by fastening the electric conductors to the insides thereof fairly near the forward ends of the blades, that is far enough along the blades so that the current does not have to travel through the prongs a very great distance. As illustrated the conductors are soldered to the prongs at about the point at which the prongs stem from the shanks. Undue heating is also minimized by the use of tungsten tips which because of their high resistance as compared to the blades which are made of steel or alloy steel, rise rapidly to the desired welding or soldering temperature long before a corresponding temperature occurs in the blades themselves. To improve electric conductance in the blades the prongs may even be flash coated with copper. The tungsten tips have the further advantage in that they do not stick to articles soldered or welded and have no affinity for the soldering material itself and stays clean and uncorroded even after prolonged use.

It should be understood that the present disclosure is for the purpose of illustration only and that this invention includes all modifications and equivalents which fall within the scope of the appended claim.

I claim:

A tool comprising a pair of blades having shank portions from which stem prongs which taper both in width and thickness to blunt pointed extremities, a spacer block interposed between the shank portions holding said blades at a predetermined spacing, said prongs being bowed toward each other so that their pointed extremities are more closely spaced than the shank portions, a slender, rigid tip made fast to each point, said tips being made of tungsten and being made fast to the blade with silver solder said tips extending beyond the points and converging but terminating short of their intersection in the normal uncompressed state of said prongs, flat plates of slightly greater overall width than the blades lying flat against the shank portions of the blades and being made fast together with the shanks to said spacer block, said plates extending forwardly of the shanks along the prongs to about mid-length of said prongs and being bowed outwardly slightly so as to be spaced from the outer surfaces of said prongs thereby providing air gaps between said plates and said prongs, said outwardly bowed portions of said plates being adapted by application of squeezing pressure to first contact the bowed prongs and then to press them toward each other sufficiently to bring the tips into contact and upon release of pressure to allow them to return to their normal spaced positions.

ROSCOE A. AMMON.

REFERENCES CITED

The following references are of record in the file of this patent:

UNITED STATES PATENTS

| Number | Name | Date |
|---|---|---|
| 2,429,039 | Warner | Oct. 14, 1947 |
| 2,449,521 | Warner | Sept. 14, 1948 |

FOREIGN PATENTS

| Number | Country | Date |
|---|---|---|
| 183,006 | Switzerland | June 2, 1936 |